April 1, 1958 A. C. LUTHER, JR 2,829,198
SWITCHING APPARATUS
Filed Nov. 17, 1954
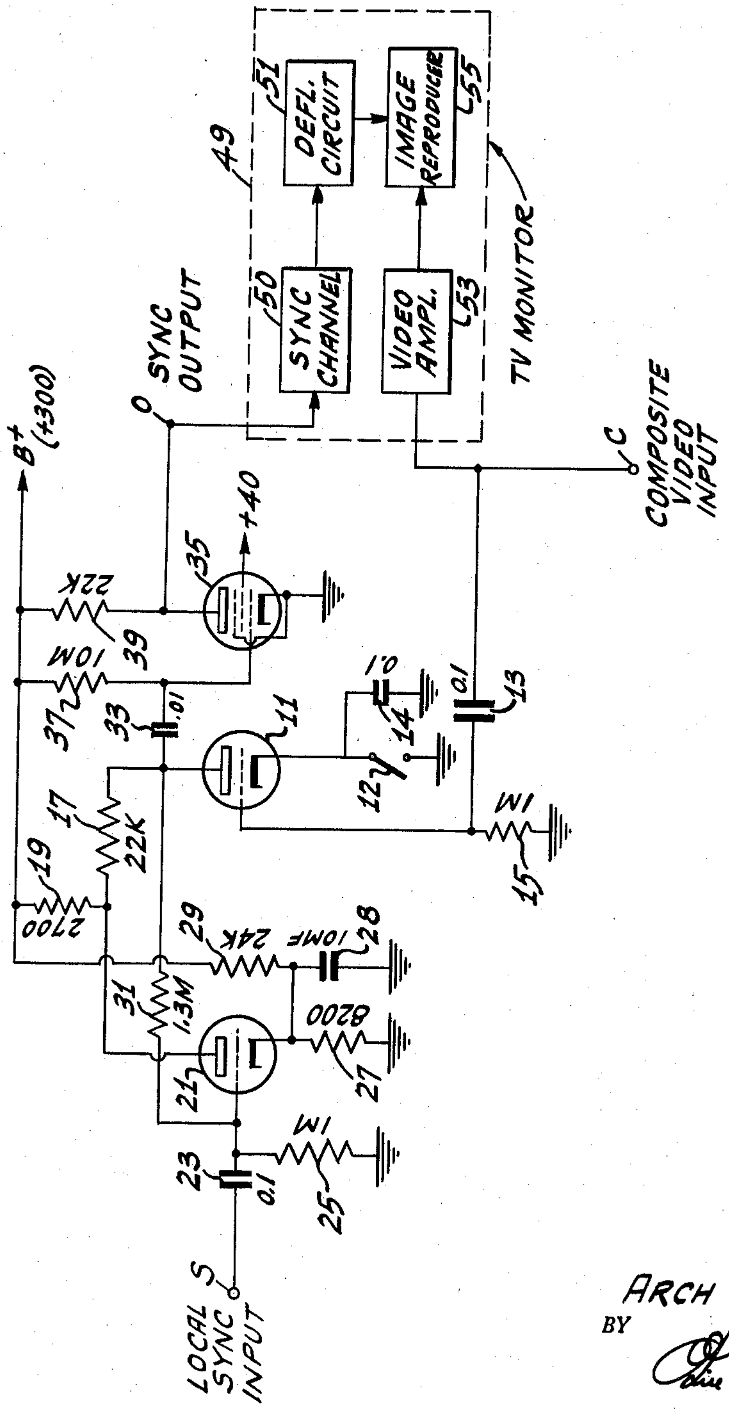
INVENTOR.
ARCH C. LUTHER, JR
BY
[signature]
ATTORNEY 2,829,198

SWITCHING APPARATUS

Arch C. Luther, Jr., Merchantville, N. J., assignor to Radio Corporation of America, a corporation of Delaware Application November 17, 1954, Serial No. 469,375

7 Claims. (Cl. 178—7.3)

The present invention relates generally to electron switching, and more particularly to novel and simplified apparatus for alternatively and selectively supplying one of a pair of independent signals to a common signal utilization device.

In accordance with an embodiment of the present invention, a pair of electron discharge devices are provided having respective input electrodes coupled to independent signal sources, and having respective output electrodes coupled to a common signal utilization device. One of the devices is biased such as to be normally in a conducting condition, while the other discharge device is biased such as to normally be in a non-conducting condition. Means are, however, provided for selectively opening the space discharge current path of the normally conducting device. Coupling is provided between the output electrode of this device and the input electrode of the other discharge device such that when the first device is cut off by opening the aforesaid current path, the normal cutoff bias on the second device is overcome and the second device is rendered conducting.

In a contemplated application of the principles of the present invention, the switching apparatus generally described above is utilized to alternatively and selectively supply either a "local" sync signal or a "remote" composite video signal to the sync signal channel of a television monitor. It will be appreciated that it is often desired in the normal use of television monitoring apparatus to switch between synchronization of the monitor deflection circuits in accordance with local and remote sync. The present invention permits use of a relatively simple electronic circuit in effecting the desired switching, with a saving in cost, and a further advantage of freedom from relay switching surges, over the more conventional use of an electromechanical relay for such operations.

Accordingly, it is a primary object of the present invention to provide novel and improved switching apparatus.

It is an additional object of the present invention to provide novel and simplified electronic switching circuitry for alternatively and selectively supplying one of a pair of independent signals to a common signal utilization device.

It is a further and particular object of the present invention to provide a novel electronic sync interlock circuit for television monitoring apparatus.

Other objects and advantages of the present invention may be readily ascertained after a reading of the following detailed description and an inspection of the accompanying drawing in which apparatus involving the application of the principles of the present invention to the alternative supply of local and remote sync signals to the sync signal channel of a television monitor is schematically illustrated.

Referring more particularly to the drawing, a pair of electron discharge devices, triodes 11 and 21, are illustrated as having their respective control grids capacitively coupled to respectively different input signal terminals. The control grid of triode 11 is coupled via capacitor 13 to input terminal "C," to which, it may be assumed for the purposes of the present illustration, a remote signal in the form of a composite video signal is applied. A grid leak resistor 15 is provided for triode 11, and its anode is connected to a suitable source of B+ potential via a pair of resistors 17 and 19 in series. A switch 12 is placed in the cathode circuit of triode 11, the switch in its closed position connecting the cathode to ground and thereby permitting conduction in triode 11. When, however, switch 12 is open, the anode-cathode circuit is broken and triode 11 is cut off. Switch 12 is bypassed to ground by capacitor 14. It will of course be appreciated that, in the actual physical setup of the described apparatus, the switch 12 may be remotely located from the rest of the monitor circuit.

The control grid of triode 21 is coupled via a capacitor 23 to the input signal terminal "S" to which, it may be assumed for the purposes of the present illustration, sync signals from a local sync generator are applied. The triode 21 is provided with a grid leak resistor 25, and its plate is connected to the B+ supply via resistor 19 of the triode 11 series plate resistor combination 17—19. The cathode of triode 21 is connected to the junction point of a pair of serially connected resistors 27 and 29, the latter series combination being connected between B+ and ground. Resistors 27 and 29 form a voltage divider which applies a positive voltage to the cathode of triode 21 of a magnitude sufficient to normally render triode 21 nonconducting. The cathode resistor 27 is bypassed to ground by capacitor 28. A resistor 31 is connected between the anode of triode 11 and the control grid of triode 21. The effect of this coupling will be more particularly considered in a subsequent description of the operation of the described circuit.

The anode of triode 11 is coupled by means of capacitor 33 to the control grid of a third electron discharge device 35, illustrated as a pentode. The pentode 35 is utilized as a conventional clipper stage, which may serve as a sync separator for signals applied to the composite video form to its input. The plate of pentode 35 is connected through a resistor 39 to B+, the control grid also connected to B+ through a resistor 37, the screen grid energized by a suitable positive potential, and the cathode and suppressor grounded. Output signals appearing at the anode are directly applied to a sync output terminal "O." In accordance with the illustrative television monitor application of the present invention, the signals appearing at the sync output terminal "O" are applied to the sync channel 50 of television monitoring apparatus 49. Since the present invention is not concerned with the details of the television monitor as such, and since such equipment is well-known, details of the monitoring apparatus 49 have not been illustrated, but conventional components thereof are presented in the drawing in block form, including the usual deflection circuits 51, video amplifier 53 and image reproducing device 55.

To explain the operation of the novel switching apparatus, it may first be assumed that it is desired to operate the monitor on "remote" sync. For such operation switch 12 is closed to complete the anode-cathode circuit of triode 11. With triode 11 in conducting condition, the composite video signal appearing at terminal "C" is applied via triode 11 to the control grid of pentode 35, the latter clipping the sync from the applied composite video waveform and applying the separated sync output to terminal "O" and the sync channel 50 of the monitor 49. Under such conditions, where triode 11 is conducting, triode 21 remains in a cutoff condition due to the cathode bias provided by divider 27—29. The potential of the anode of the conducting triode 11 is sufficiently low so that the fraction thereof appearing at the control grid of triode 21 due to the voltage division provided by resistors 31 and 25 cannot alter this cutoff condition. The local sync signals appearing at terminal "S" are thus blocked from passage to the input of pentode 35.

However, when it is desired to switch the monitoring apparatus 49 to operation on local sync, the switch 12 is opened, opening the anode-cathode current path of triode 11, which is thereby cut off, blocking passage of the composite video signals from terminal "C" to the sync separator input. When triode 11 is cutoff, however, the voltage at its anode rises to approach B+. The voltage increase is such that the voltage appearing at the control grid of triode 21 due to the voltage division provided by the grid leak resistor 25 and the coupling resistor 31 is sufficient to overcome the cutoff bias applied to the cathode, and triode 21 is rendered conducting. The local sync signals thus find a path through triode 21, resistor 17, and capacitor 33 to the input of the pentode 35. While pentode 35 is required to perform no sync "separating" function under this condition of operation, it serves to pass the local sync signals to terminal "O" and the sync channel 50 of the monitoring apparatus 49. It may be noted that the splitting of the plate load of triodes 11 and 21 in the manner illustrated in the drawing insures that conduction or nonconduction in triode 11 as controlled by switch 12 is always capable of controlling the bias of triode 21, regardless of the conducting condition of triode 21.

There has thus been described a simple electronic switching circuit which readily permits the selective application of one of a pair of independent input signals to a common utilization device. While use of the invention for a specific monitor sync interlock purpose has been particularly illustrated and described, the principles of the invention may readily extend to the performance of numerous other selective switching functions.

It may be noted that specific values of capacitance, resistance, and voltage are indicated on the drawing for the illustrated circuit, these values being expressed in terms of microfarads, ohms, and volts, respectively, unless otherwise indicated. It will, however, be appreciated that these values are given by way of example only, and the invention should not be considered to be in any way limited to the choice of these specific circuit constants. Also, as an example of tube types which may be satisfactorily employed in the illustrated circuit, tubes 11 and 21 may comprise respective halves of a double-triode of the 6BQ7A type, and tube 35 may comprise the pentode section of a pentode-triode of the 6AN8 or 6U8 types.

Having thus described the invention, what is claimed is:

1. In a signalling system including a pair of independent signal sources and a common signal utilization device, apparatus for alternatively and selectively supplying signals from one of said signal sources to said signal utilization device, said apparatus comprising in combination a pair of electron discharge devices, each of said electron discharge devices having an input and an output circuit, means for coupling the input circuit of each of said discharge devices to a respectively different one of said signal sources, means for coupling the output circuit of each of said discharge devices to said common signal utilization device, biasing means for rendering one of said discharge devices normally nonconducting, additional biasing means for rendering the other of said discharge devices normally conducting, switching means associated with said other discharge device for selectively opening the space discharge current path of said other discharge device, and means responsive to the selective opening of said space discharge current path for overcoming the bias on said one discharge device and rendering said one discharge device conducting for the duration of the selective opening of the space discharge current path of said other discharge device.

2. Apparatus in accordance with claim 1 wherein said path opening responsive means includes a voltage divider coupled between a point in the output circuit of said other discharge device and a point of reference potential and means for deriving an additional biasing voltage for said one discharge device from said voltage divider.

3. In a signalling system including a pair of independent signal sources and a common signal utilization device, apparatus for alternatively and selectively supplying signals from one of said signal sources to said signal utilization device, said apparatus comprising in combination a pair of electron tubes, each including an anode, a cathode and a control grid, means for applying signals from each of said sources to the control grid of a respectively different one of said tubes, means for coupling the anodes of both of said tubes to said signal utilization device, means for providing one of said tubes with an operating bias, means for providing the other of said tubes with a cutoff bias, a switch for selectively opening and closing the anode-cathode current path of said one tube, and means including a resistance coupled between the anode of said one tube and the control grid of said other tube for overcoming the cutoff bias on said other tube when said switch selectively opens the anode-cathode current path of said one tube whereby said other tube is provided with an operating bias for the duration of the selective opening of the anode-cathode current path of said one tube.

4. In combination with televison monitoring apparatus including a sync signal channel, apparatus for alternatively and selectively supplying local and remote sync signals to said sync signal channel, said apparatus comprising in combination a pair of electron tubes, each including an anode, a cathode and a control grid, a signal utilization device having an input circuit and an output circuit, said output circuit being coupled to said sync signal channel, means for applying said local sync signals to the control grid of a first of said pair of electron tubes, means for applying said remote sync signals to the control grid of the second of said pair of electron tubes, means for coupling the anodes of both of said electron tubes to the input circuit of said signal utilization device, means for additionally coupling the anode of said second electron tube to the control grid of said first electron tube, means for applying a cutoff bias to the cathode of said first electron tube, said second electron tube being normally biased above cutoff, means for normally completing a current path between the anode and cathode of said second tube, and means for selectively opening said current path.

5. In a signalling system provided with a television monitor, a sync signal channel for applying sync signals to synchronize the deflection circuits of said television monitor, a source of local sync signals, and a source of remote composite video signals, apparatus comprising the combination of a sync signal separator having an input circuit and an output circuit, said output circuit being coupled to said sync signal applying means, a pair of electron tubes each having an anode, a cathode and a control electrode, means for coupling the control grid of a first of said pair of electron tubes to said composite video signal source, means for coupling the control grid of the second of said pair of electron tubes to said local sync signal source, means for coupling the cathode of said first tube to a point of reference potential, said last-named coupling means including a switch for alternatively breaking or making the connection of said cathode to the point of reference potential, means for coupling the anode of said first tube to the input circuit of said sync signal separator, a pair of voltage dividers, one of said voltage dividers being coupled between the anode of said first tube and a point of reference potential, the control grid of said second tube being connected to an intermediate point on said one voltage divider, the cathode of said second tube being connected to an intermediate point on the other of said pair of voltage dividers, means for applying a positive voltage to said other voltage divider, the cathode bias voltage derived from said other voltage divider being sufficiently positive relative to the grid biasing voltage derived from said one voltage divider when said switch makes said connection that said second tube is cut off but being insufficient to cut off said second tube when said switch breaks said connection, and means for coupling the anode of said second tube to the input circuit of said sync signal separator.

6. In a signalling system including a pair of independent signal sources and a signal utilization device having an input circuit, apparatus comprising the combination of means including a first tube for applying signals from a first of said pair of signal sources to said input circuit when said first tube is conducting, means including a second tube for applying signals from the other of said pair of signal sources to said input circuit when said second tube is conducting, means for selectively open-circuiting said first tube, means for normally biasing said second tube to cutoff, and means responsive to the selective open-circuiting of said first tube for overcoming the cutoff bias on said second tube for the duration of the selective open-circuiting of said first tube.

7. In combination with a source of local sync signals, a source of remote composite video signals, and television monitoring apparatus including a sync signal signal channel, apparatus comprising in combination a sync signal separator including an input electrode and an output electrode, said output electrode being coupled to said sync signal channel, a first triode, means for coupling the control grid of said first triode to said composite video signal source, resistive means for coupling the anode of said first triode to a point of B+ potential, a switch for alternatively making or breaking a connection between the cathode of said first triode and a point of reference potential, means for coupling the anode of said first triode to the input electrode of said sync signal separator, a second triode, means for coupling the control grid of said second triode to said local sync signal source, a resistive voltage divider connected between the anode of said first triode and a point of reference potential, means for connecting the control grid of said second triode to an intermediate point on said voltage divider, an additional voltage divider connected between said point of B+ potential and the point of reference potential, means for connecting the cathode of said second triode to an intermediate point on said additional voltage divider, and means for connecting the anode of said second triode to an intermediate point of said resistive coupling means.

References Cited in the file of this patent

UNITED STATES PATENTS

| | | |
|---|---|---|
| 2,411,598 | Smith | Nov. 26, 1946 |
| 2,412,111 | Wilson | Dec. 3, 1946 |
| 2,432,204 | Miller | Dec. 9, 1947 |